July 30, 1957 C. W. HUNTER 2,801,031
FLUID METERING DEVICE
Filed May 23, 1955

INVENTOR.
Charley Ward Hunter
BY
ATTORNEY.

United States Patent Office 2,801,031
Patented July 30, 1957

2,801,031

FLUID METERING DEVICE

Charley Ward Hunter, Kansas City, Mo., assignor to The Vendo Company, Kansas City, Mo., a corporation of Missouri Application May 23, 1955, Serial No. 510,179

5 Claims. (Cl. 222—361)

This invention relates to a fluid metering device and particularly to a hollow element shiftably mounted within a tank for receiving a measured quantity of liquid from the tank and dispensing the same exteriorly thereof.

It is the most important object of the present invention to provide a simple, inexpensive, yet accurate metering element normally disposed within a liquid tank for receiving the liquid and reciprocable to and from a position dispensing the liquid contained therein while blocking the flow of fluid from the tank so that during each operation, only the content of the hollow element is dispensed.

Another important object of the present invention is to provide a fluid metering device in the nature of a self-contained unit adapted for mounting in association with a fluid receptacle without need of modification of the latter in any way other than the provision of an opening for receiving the device.

A further object of this invention is the provision of fluid metering means having as a part thereof an automatic lock operable upon drop of the liquid to a predetermined level and mounted on a bracket that is in turn secured to the metering device itself.

Other objects include the way in which the metering tube is reciprocably mounted in a collar that is in turn provided with sealing means surrounding the tube; the way in which a slot and pin arrangement is provided to limit the extent of outward movement of the metering element and hold the same against rotation; the way in which the lock is provided with an extension that moves into the slot within the path of travel of the pin when the liquid level drops toward a point where the metering device is no longer immersed therein; and the manner of operating the lock through use of a buoyant member that floats in the liquid.

Other objects include important details of construction to be made clear as the following specification progresses.

Figure 1:
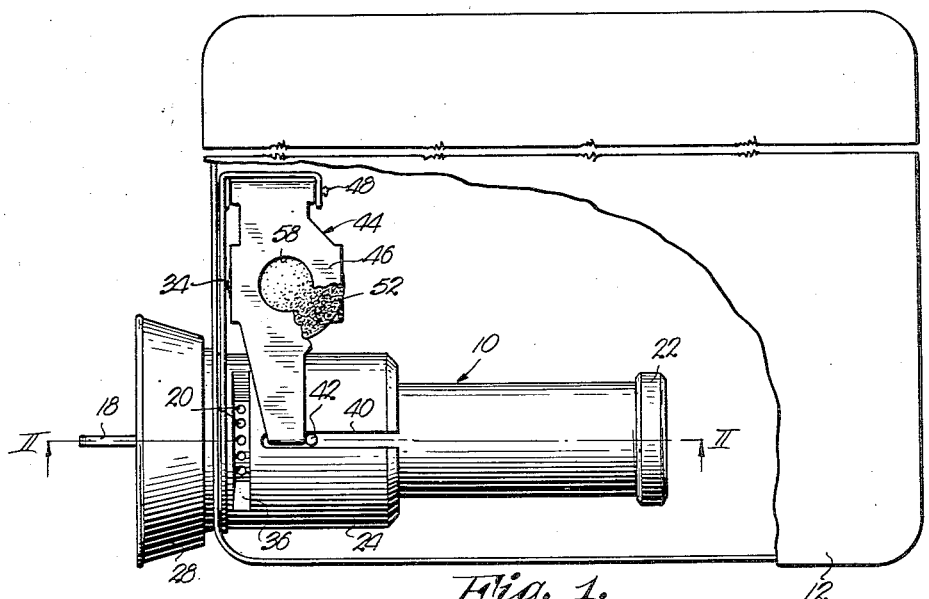
Figure 1 is a top plan view showing a receptacle broken away to reveal the fluid metering device made according to the present invention.

The fluid metering device forming the subject matter of the instant invention is broadly designated by the numeral 10 and shown in the drawing operably mounted within a suitable fluid-receiving receptacle 12, the latter being modified only by the provision of an opening 14 in one side wall thereof adjacent its bottom.

The device 10 includes a hollow metering element 16 preferably in the nature of an elongated, cylindrical tube having the outermost end thereof closed and provided with a handle 18. Element 16 is provided with a plurality of ports 20 at the top and bottom thereof, element 16 being otherwise imperforate since the innermost end thereof is closed by a removable cap 22.

Metering tube 16 is reciprocable on its horizontal longitudinal axis within a collar 24 having an externally threaded end 26 that extends through the opening 14 in the receptacle 12. Collar 24 is held in place through the medium of an external nut 28 mounted on the threaded end 26 of collar 24. The frusto-conical nut 28 presents spout means for controlling the direction of flow of fluid being dispensed by the metering device.

The threaded end 26 of collar 24 contains a seal 30 surrounding the tube 16 and when the nut 28 is tightened on the threaded end 26, a gasket 32, as well as a bracket 34 surrounding the collar, are clamped into place against the innermost face of the receptacle 12.

Figure 2:
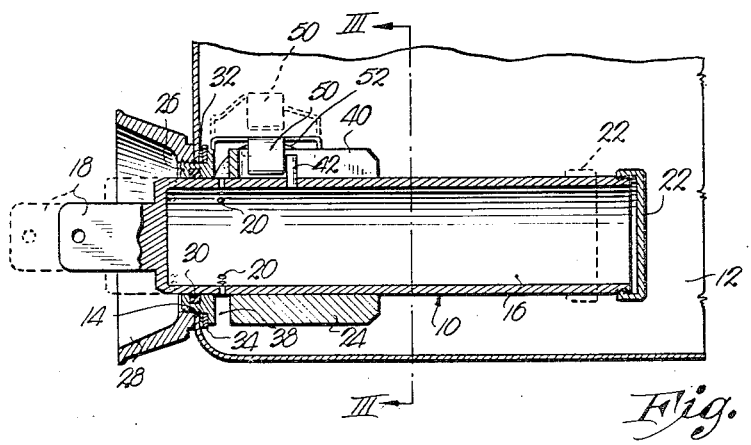
Fig. 2 is a longitudinal, cross-sectional view taken on line II—II of Fig. 1.
Figure 3:
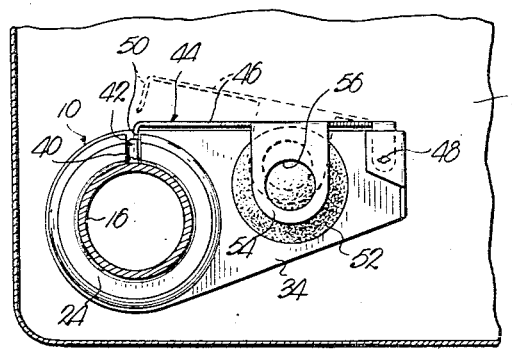
Fig. 3 is a transverse, cross-sectional view taken on line III—III of Fig. 2.

Collar 24 is provided with elongated holes 36 and 38 at the top and bottom thereof with which the ports 20 register when the tube 16 is at the innermost end of its path of travel as seen in Figs. 1 and 2.

A longitudinal slot 40 in the collar 24 receives a projection on the tube 16 in the nature of a pin 42 which holds the tube 16 against rotation within the collar 24, thereby assuring registry between the ports 20 and the holes 36.

Lock means 44 includes a plate 46 swingably mounted on the bracket 34 through the medium of hinge pin 48. Plate 46 has a downturned extension 50 that moves into the slot 40 within the path of travel of the pin 42 when the plate 46 is at the lowermost end of its path of travel.

Plate 46 carries a spherical buoyant member 52 of any suitable nature therebeneath. It is held in place by a pair of downturned ears 54 on the plate 46 provided with perforations 56 for receiving the member 52. Plate 46 is likewise provided with a perforation 58 and into which the member 52 extends when supported by the opposed ears 54.

It is manifest that when the metering element 16 is at the innermost end of its path of travel, as shown by Fig. 1 and by full lines in Fig. 2, ports 20 register with holes 36 and the liquid within receptacle 12 is free to flow into the tube 16, thereby filling the same. When the handle 18 is grasped to pull the tube 16 outwardly to the dotted line position shown in Fig. 2, the ports 20 move to a position exteriorly of the tank 12 and the contents of the tube 16 are dispensed to the spout means 28 by way of ports 20.

While the tube 16 is at the outermost end of its path of travel, fluid from the tank 12 cannot flow into the tube 16 nor past the seal 30. Therefore, when the tube 16 is returned to the innermost end of its path of travel, it is again automatically filled with the liquid.

The metering device 10 must be immersed within the liquid in order to completely fill and, therefore, provide a full measure. Thus, as soon as the level of the liquid lowers to a point where the extension 50 moves into the slot 40, pin 42, striking the extension 50, prevents outward movement of the tube 16.

Having thus described the invention what is claimed as new and desired to be secured by Letters Patent is:

1. For use with a liquid receptacle having an opening therein, a liquid metering device comprising a hollow metering element provided with a port, said element being otherwise imperforate; means slidably mounting the element in said opening for movement from a normal position with said port disposed within the tank to receive liquid therefrom to a position disposing the port exteriorly of the tank for discharging the liquid from said element through the port; and lock means mounted in the tank for movement to and from a position engaging said element for holding the same against outward movement, said lock means having a buoyant member thereon for maintaining the same in an unlocked position until the liquid within the tank drops to a predetermined level.

2. For use with a liquid receptacle having an opening therein, a liquid metering device comprising a collar mounted in said opening and extending inwardly into the tank, said collar having a hole within the tank; a hollow metering element provided with a port, said element being otherwise imperforate; means slidably mounting the element in said collar for movement from a normal position with said port registering with said hole to receive liquid from the tank to a position disposing the port exteriorly of the tank for discharging the liquid from said element through the port; a projection on said element slidably engaging the collar for holding the element against rotative movement, whereby the port aligns with the hole when said element is at the innermost end of its path of travel; and lock means mounted in the tank for movement to and from a position engaging said projection for holding the element against outward movement, said lock means having a buoyant member thereon for maintaining the same in an unlocked position until the liquid within the tank drops to a predetermined level.

3. For use with a liquid receptacle having an opening therein, a liquid metering device comprising a collar mounted in said opening and extending inwardly into the tank, said collar having a hole within the tank; a hollow metering element provided with a port, said element being otherwise imperforate; means slidably mounting the element in said collar for movement from a normal position with said port registering with said hole to receive liquid from the tank to a position disposing the port exteriorly of the tank for discharging the liquid from said element through the port, said collar having a slot; a projection on said element slidably engaging the collar within the slot for holding the element against rotative movement, whereby the port aligns with the hole when said element is at the innermost end of its path of travel; and lock means mounted in the tank for movement to and from a position engaging said projection for holding the element against outward movement, said lock means having a buoyant member thereon for maintaining the same in an unlocked position until the liquid within the tank drops to a predetermined level, said lock means having an extension disposed in the slot within the path of travel of said projection when the lock means is locked.

4. For use with a liquid receptacle having an opening therein, a liquid metering device comprising a collar mounted in said opening and extending inwardly into the tank, said collar having a hole within the tank; a hollow metering element provided with a port, said element being otherwise imperforate; means slidably mounting the element in said collar for movement from a normal position with said port registering with said hole to receive liquid from the tank to a position disposing the port exteriorly of the tank for discharging the liquid from said element through the port, said collar having a slot; a projection on said element slidably engaging the collar within the slot for holding the element against rotative movement, whereby the port aligns with the hole when said element is at the innermost end of its path of travel; lock means mounted in the tank for movement to and from a position engaging said projection for holding the element against outward movement, said lock means having a buoyant member thereon for maintaining the same in an unlocked position until the liquid within the tank drops to a predetermined level, said lock means having an extension disposed in the slot within the path of travel of said projection when the lock means is locked; and a bracket mounted on the collar within the tank, said lock means being swingably mounted on the bracket.

5. For use with a liquid receptacle having an opening therein, a liquid metering device comprising a collar mounted in said opening and extending inwardly into the tank, said collar having a hole within the tank; a hollow metering element provided with a port, said element being otherwise imperforate; means slidably mounting the element in said collar for movement from a normal position with said port registering with said hole to receive liquid from the tank to a position disposing the port exteriorly of the tank for discharging the liquid from said element through the port, said collar having a slot; a projection on said element slidably engaging the collar within the slot for holding the element against rotative movement, whereby the port aligns with the hole when said element is at the innermost end of its path of travel; lock means mounted in the tank for movement to and from a position engaging said projection for holding the element against outward movement, said lock means having a buoyant member thereon for maintaining the same in an unlocked position until the liquid within the tank drops to a predetermined level, said lock means having an extension disposed in the slot within the path of travel of said projection when the lock means is locked; a bracket mounted on the collar within the tank, said lock means being swingably mounted on the bracket; and spout means releasably attached to the collar exteriorly of the tank for securing the collar to the tank within the opening and for clamping the bracket between the collar and the tank, said spout means being disposed to control the direction of flow of fluid emanating from said port.

References Cited in the file of this patent

UNITED STATES PATENTS

| | | |
|---|---|---|
| 571,685 | Price | Nov. 17, 1896 |
| 1,215,667 | Legge | Feb. 13, 1917 |
| 1,233,791 | Kaiser | July 17, 1917 |
| 1,735,390 | Henderson | Nov. 12, 1929 |
| 2,066,827 | De Witt | Jan. 5, 1937 |